US010099682B1

(12) United States Patent
Johri et al.

(10) Patent No.: US 10,099,682 B1
(45) Date of Patent: Oct. 16, 2018

(54) CONTROLLING MOTOR TORQUE TO RESERVE BATTERY ENERGY IN A HYBRID VEHICLE

(71) Applicant: FORD GLOBAL TECHNOLOGIES, LLC, Dearborn, MI (US)

(72) Inventors: Rajit Johri, Canton, MI (US); Fazal Urrahman Syed, Canton, MI (US); Justin Panhans, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 15/470,076

(22) Filed: Mar. 27, 2017

(51) Int. Cl.
*B60W 20/15* (2016.01)

(52) U.S. Cl.
CPC .................................. *B60W 20/15* (2016.01)

(58) Field of Classification Search
None
See application file for complete search history.

(56) References Cited

U.S. PATENT DOCUMENTS

| 8,583,306 B2 | 11/2013 | Arnett et al. |
| 9,376,006 B2 | 6/2016 | Terayama et al. |
| 9,415,764 B2 | 8/2016 | Zhang et al. |
| 2016/0009270 A1* | 1/2016 | Zhang ...................... B60K 6/48 477/5 |
| 2016/0137182 A1* | 5/2016 | Johri ..................... B60W 20/10 701/22 |

* cited by examiner

*Primary Examiner* — John D Walters
*Assistant Examiner* — Hilary L Johns
(74) *Attorney, Agent, or Firm* — David B. Kelley; Brooks Kushman P.C.

(57) ABSTRACT

A hybrid vehicle includes an engine, a traction motor, a battery, and a controller. The controller is programmed to, responsive to the engine achieving maximum torque capacity while the engine and motor operate to completely satisfy a demand that exceeds the maximum torque capacity, maintain the engine at the maximum torque capacity and reduce torque output of the motor to a non-zero value such that the engine and motor do not operate to completely satisfy the demand.

19 Claims, 3 Drawing Sheets

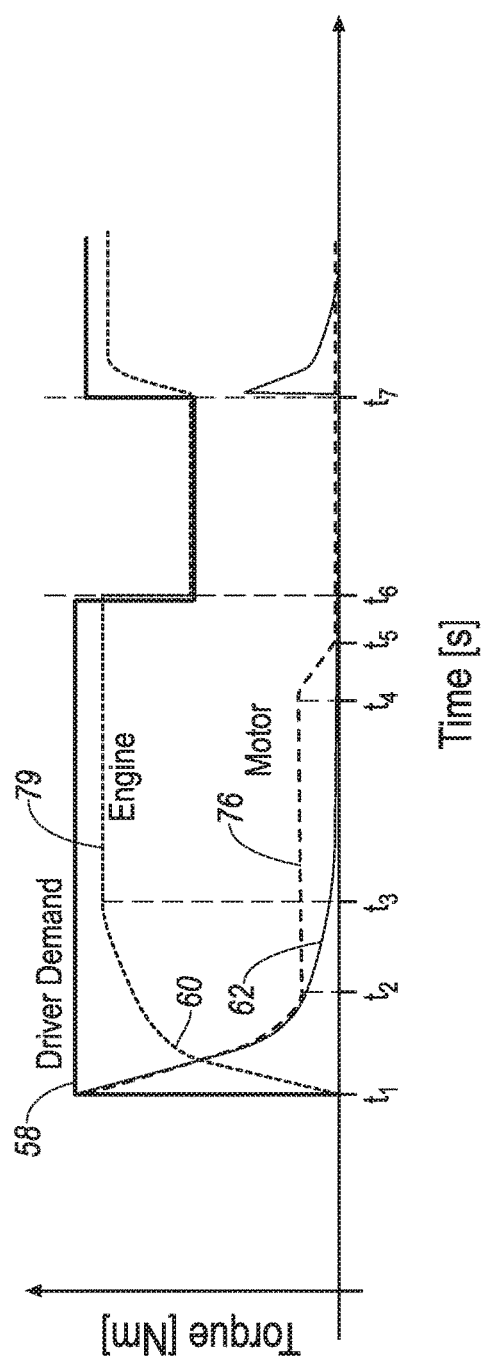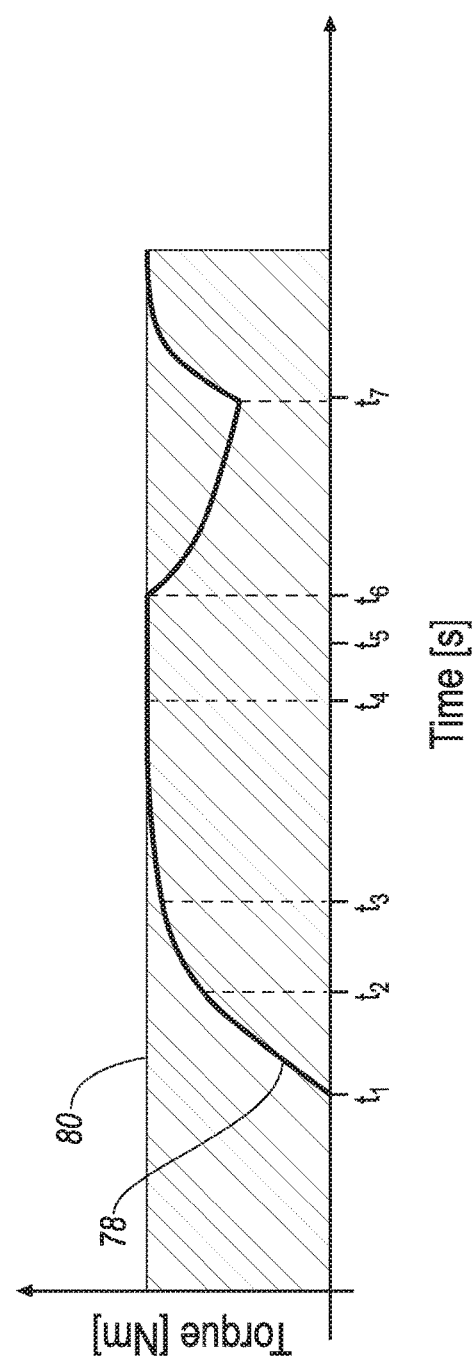

CONTROLLING MOTOR TORQUE TO RESERVE BATTERY ENERGY IN A HYBRID VEHICLE

TECHNICAL FIELD

The present disclosure relates to a control strategy in a hybrid vehicle that controls motor torque to reserve battery energy for engine torque under delivery in subsequent driver torque demands.

BACKGROUND

Hybrid electric vehicles (HEVs) may include an internal combustion engine and a traction motor to provide power to propel the vehicle. The traction motor may be powered by a high-voltage battery. The traction motor may be used to compensate for engine under delivery due to engine lag and/or when a driver torque demand exceeds a maximum torque capacity of the engine. While the traction motor may be able to compensate for the engine, such compensation may result in depletion of the battery such that insufficient battery energy is available for subsequent driver torque demands. Specifically, under some conditions, the motor may be unable to provide sufficient torque output (due to lack of battery energy) to compensate for engine under delivery during engine lag to meet a subsequent demand.

SUMMARY

According to one embodiment, a hybrid vehicle includes an engine, a traction motor, and a controller. The controller is programmed to, responsive to the engine achieving maximum torque capacity while the engine and motor operate to completely satisfy a demand that exceeds the maximum torque capacity, maintain the engine at the maximum torque capacity and reduce torque output of the motor to a non-zero value such that the engine and motor do not operate to completely satisfy the demand.

According to another embodiment, a method for controlling a powertrain in a hybrid vehicle includes, responsive to an engine approaching maximum torque capacity while the engine and a motor operate together to completely satisfy a demand that exceeds the maximum torque capacity, operating the engine to approach maximum torque capacity and reducing torque output of the motor to a non-zero value such that the engine and motor do not operate to completely satisfy the demand.

According to another embodiment, a powertrain system for a vehicle includes a controller programmed to, responsive to a predefined torque limit of a motor falling below a desired motor torque while an engine and the motor operate to completely satisfy a propulsive demand, command the motor to output a torque at the predefined torque limit such that the demand is not completely satisfied.

BRIEF DESCRIPTION OF THE DRAWINGS

FIGS. 3 and 4 are associated time plots illustrating driver torque demands, engine and motor torques to satisfy the demands, and battery energy consumed.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
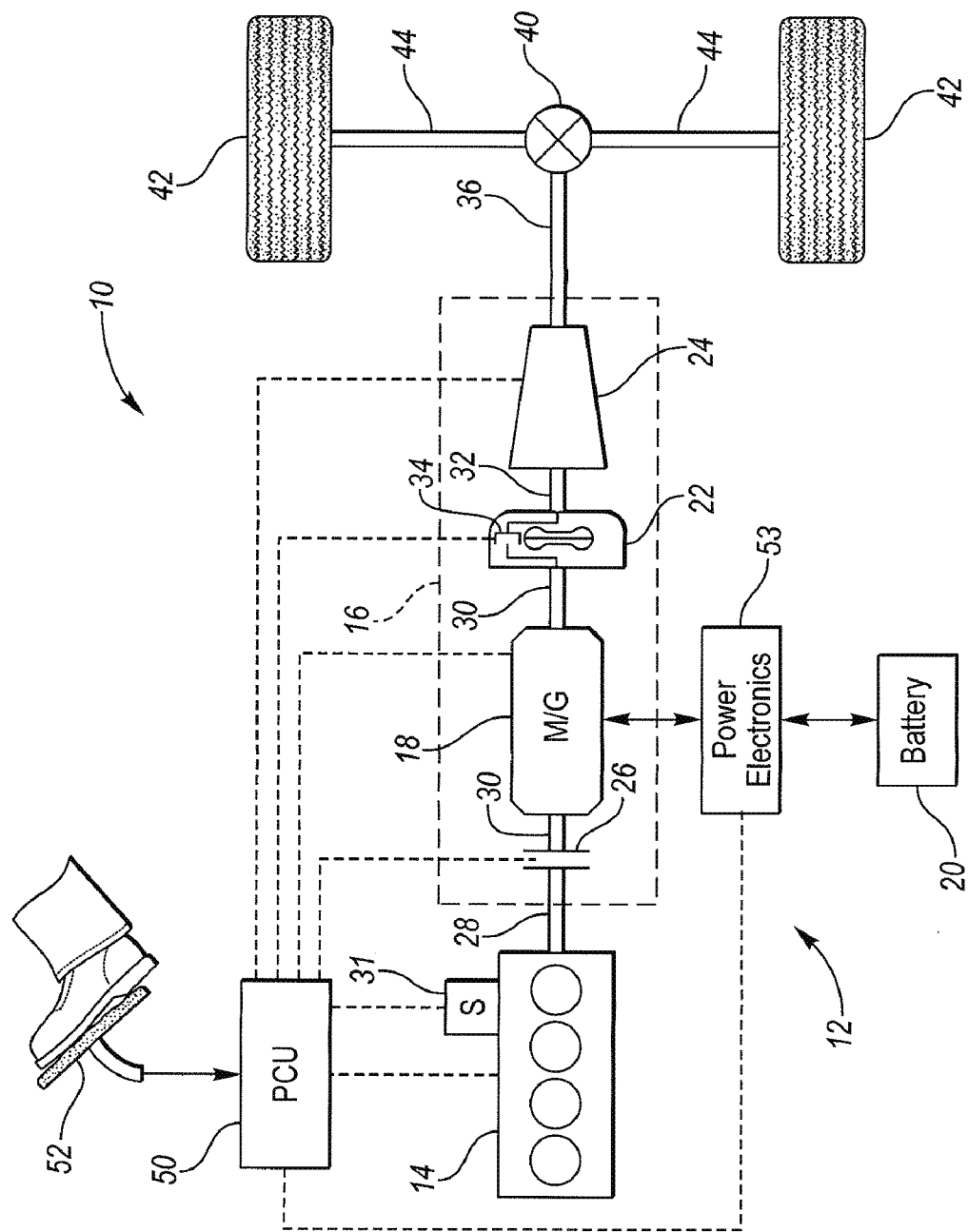
FIG. 1 illustrates a schematic of one example of a hybrid electric vehicle having various powertrain components that are controlled by a control system.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle 10 may vary. The vehicle 10 includes a powertrain or powertrain system 12, which may include an engine 14 that drives an automatic transmission 16. As will be described in further detail below, transmission 16 includes an electric machine such as an electric motor/generator ("M/G" or "motor") 18, an associated traction battery 20, a torque converter 22, and a multiple step-ratio automatic transmission, or gearbox 24. The engine 14, M/G 18, torque converter 22, and the automatic transmission 16 may be connected sequentially in series, as illustrated in FIG. 1.

The engine 14 and the M/G 18 are both drive sources for the vehicle 10. The engine 14 generally represents a power source that may include an internal combustion engine such as a gasoline, diesel, or natural gas-powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the vehicle 10. The M/G 18 is continuously drivably connected to the shaft 30, which extends through the M/G 18, whereas the engine 14 is drivably connected to the shaft 30 only when the disconnect clutch 26 is at least partially engaged.

A separate starter motor 31 can be selectively engaged with the engine 14 to rotate the engine 14 to allow combustion to begin. Once the engine 14 is started, the starter motor 31 can be disengaged from the engine 14 via, for example, a clutch (not shown) between the starter motor 31 and the engine 14. In one embodiment, the engine 14 is started by the starter motor 31 while the disconnect clutch 26 is open, keeping the engine 14 disconnected with the M/G 18. Once the engine 14 has started and is brought up to speed with the M/G 18, the disconnect clutch 26 can couple the engine 14 to the M/G to allow the engine 14 to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G 18.

The M/G 18 is connected to the torque converter 22 via shaft 30. The torque converter 22 is therefore connected to the engine 14 when the disconnect clutch 26 is at least partially engaged. The torque converter 22 may include an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch, and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain 12 to one or more wheels 42. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit and one or more other controllers can collectively be referred to as a "controller" that controls various actuators in response to signals from various sensors to control functions such as starting/stopping, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 50 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 53. In some embodiments, power electronics 53 condition direct current (DC) power provided by the battery 20 to the requirements of the M/G 18. For example, power electronics 53 may provide three phase alternating current (AC) to the M/G 18. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle 10. In general, depressing and releasing the pedal 52 generates an accelerator pedal position signal that may be interpreted by the controller 50 as a demand for increased power or decreased power, respectively. Based at least upon input from the pedal 52, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle 10 with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle 10, this operation mode may be referred to as the "engine mode," "engine-only mode," or "mechanical mode." The M/G 18 may assist the engine 14 by providing additional power to turn the shaft 30. This operation mode may be referred to as a "hybrid mode," an "engine-motor mode," or an "electric-assist mode."

To drive the vehicle 10 with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring to power electronics 53 that may include an inverter, for example. The controller 50 commands the power electronics 53 to convert voltage from the battery 20 to an AC voltage provided to the M/G 18 to provide positive or negative torque to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

Figure 2:
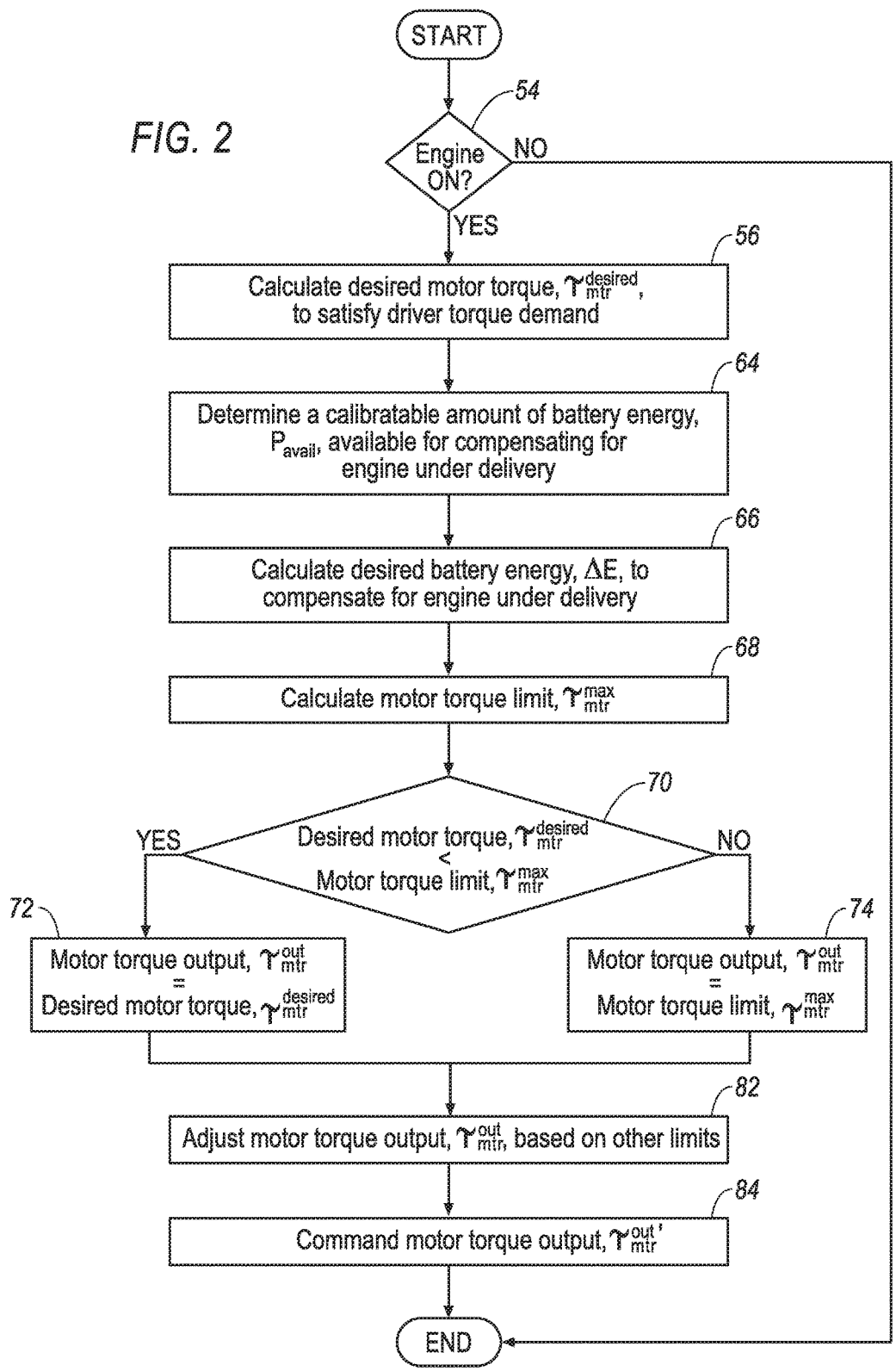
FIG. 2 illustrates a flowchart representing one embodiment of an algorithm implemented by a controller of the vehicle of FIG. 1 to control motor torque to reserve battery energy.

FIG. 2 illustrates a flowchart representing one embodiment of an algorithm implemented by the controller 50 to control motor torque to reserve battery energy. FIGS. 3 and 4 are associated time plots illustrating driver torque demands, engine and motor torques to satisfy the demands, and battery energy consumed. The algorithm may begin with the step 54 of determining whether the engine 14 is ON. The engine 14 may be considered to be ON when the engine 14 is outputting torque to satisfy a driver torque demand, for example. If the engine 14 is ON, the algorithm may continue with the step 56 of calculating a desired motor torque, $\tau_{mtr}^{desired}$, to satisfy the demand. In one embodiment, the desired motor torque may be calculated according to Equation (1) below.

$$\tau_{mtr}^{desired} = \tau_{drv}^{dem} - \tau_{eng} \qquad (1)$$

where $\tau_{drv}^{dem}$ is the driver torque demand, and $\tau_{eng}$ is the actual torque output of the engine 14 to meet the driver torque demand. If the engine 14 can completely satisfy the demand, then the desired motor torque may be zero.

As shown in FIG. 3, a fast driver torque demand increase (illustrated as curve 58 showing $\tau_{drv}^{dem}$) may result in a fast torque request to the engine 14. There may be inherent delays in transient engine torque (as seen from curve 60, which illustrates $\tau_{eng}$), especially with a turbocharged engine, which may lead to a period after the fast driver torque demand increase where the driver torque demand is not completely satisfied by the engine 14 alone. This may result in a delayed acceleration response apparent to the driver. As such, the motor 18 may contribute torque output to satisfy the driver torque demand as shown by curve 62, which illustrates torque output of the motor 18 controlled by the algorithm of FIG. 2. The period of time between $t_1$ and $t_3$ may be referred to as the "fill-in" period since the motor 18 fills in for the engine 14 as the engine torque output ramps up.

Referring back to FIG. 2, the algorithm may continue with the step 64 of determining a calibratable amount of battery energy, $P_{batt}^{avail}$, available for compensating for engine under delivery. In one embodiment, $P_{batt}^{avail}$ may be based on the driver torque demand. For example and without limitation, for a low driver torque demand, $P_{batt}^{avail}$, may be low, and for a high driver torque demand, $P_{batt}^{avail}$ may be high. $P_{batt}^{avail}$ may also be based on a state-of-charge (SOC) of the battery 20. For example and without limitation, for a low SOC, $P_{batt}^{avail}$ may be relatively low. In one embodiment, $P_{batt}^{avail}$ may be retrieved from a look-up table assigning values of $P_{batt}^{avail}$ based on driver torque demand and battery SOC. The value of $P_{batt}^{avail}$ will vary depending on the size of the vehicle, size of the battery, etc. For some applications, $P_{batt}^{avail}$ may be in the range of 2 kJ to 10 kJ.

The algorithm may continue with the step 66 of calculating a desired battery energy, $\Delta E$, to compensate for engine under delivery. In one embodiment, $\Delta E$ may be calculated according to Equation (2) below.

$$\Delta E = \int_{t_1}^{t_2} \Delta P \cdot dt \quad (2)$$

where $\Delta P$ is engine power under delivery, $t_1$ and $t_2$ are the initial and final times of the moving horizon window, and dt is the discrete time step of the controller 50. In one embodiment, $\Delta P$ may be calculated according to Equation (3) below.

$$\Delta P = (\tau_{drv}^{dem} - \tau_{eng}) * \omega_{imp} \quad (3)$$

where $\omega_{imp}$ is a speed of the impeller of the torque converter 22.

The algorithm may continue with the step 68 of calculating a motor torque limit, $\tau_{mtr}^{max}$. The motor torque limit may be a predefined torque limit of the motor 18 and be used to limit torque output of the motor 18 such that a fixed amount of battery energy is available for subsequent driver torque demands. In one embodiment, the motor torque limit may be calculated according to Equations (4) and (5) below.

$$\tau_{mtr}^{max} = \frac{(P_{batt}^{avail} \cdot (t_2 - t_1) - \Delta E)}{\omega_{imp} \cdot dt} \quad (4)$$

$$\tau_{mtr}^{max} = \frac{\left(P_{batt}^{avail} \cdot (t_2 - t_1) - \int_{t_1}^{t_2} (\tau_{drv}^{dem} - \tau_{eng}) \cdot \omega_{imp} \cdot dt\right)}{\omega_{imp} \cdot dt} \quad (5)$$

As such, the torque output may be constrained by the motor torque limit, $\tau_{mtr}^{max}$, to compensate for engine under delivery with consideration for battery energy within a temporal sliding window. The predefined motor torque limit may be based on data indicative of an amount of battery energy consumed to satisfy the demand within a temporal sliding window.

The algorithm may continue with the step 70 of determining whether the desired motor torque, $\tau_{mtr}^{desired}$, less than the motor torque limit, $\tau_{mtr}^{max}$. If at step 70 the controller 50 determines that the desired motor torque is less than the motor torque limit, the algorithm may continue with the step 72 of setting a motor torque output to the desired motor torque. In such cases, the desired motor torque is unconstrained by the limit, and the motor 18 is permitted to output the desired motor torque such that the driver torque demand is completely satisfied by the engine 14 and motor 18.

If at step 70, the controller 50 determines that the desired motor torque is not less than the motor torque limit, the algorithm may continue with the step 74 of setting the motor torque output to the motor torque limit. In such cases, the motor torque output is reduced to reserve an amount of battery energy for subsequent drive torque demands. By constraining the motor torque output to follow the motor torque limit may result in the engine 14 and motor 18 not completely satisfying the driver torque demand.

Steps 70, 72, 74 may be summarized by Equation (6) below.

$$\tau_{mtr}^{out} = \min(\tau_{mtr}^{desired}, \tau_{mtr}^{max}) \quad (6)$$

where $\tau_{mtr}^{out}$ is the motor torque output. As shown in Equation (6), the controller 50 may be programmed to select a lesser of (i.e., a minimum of) the desired motor torque and the motor torque limit.

Referring to FIG. 3, the plot illustrated therein shows driver torque demand 58, engine torque 60, and motor torque output 62 as a function of time. As shown in the plot, the engine 14 and motor 18 operate together to completely satisfy the driver torque demand between $t_1$ and $t_2$. At $t_2$, however, the motor torque output is reduced to a level such that the engine 14 and motor 18 do not operate to completely satisfy the driver torque demand. As such, from $t_2$ to $t_6$ the driver torque demand is not completely satisfied.

Still referring to FIG. 3, curve 76 illustrates motor torque output that is unconstrained by the motor torque limit described above. If the motor torque output is set to be the desired motor torque, then the driver torque demand is completely satisfied by the engine 14 and motor 18 between $t_2$ and $t_5$. At $t_5$, battery energy is depleted, and the motor 18 no longer has sufficient power to output propulsive torque for compensating engine under delivery.

At $t_3$, the engine 14 achieves maximum torque capacity 79. The period of time between $t_3$ and $t_6$ may be referred to as engine "steady-state". In the illustrated embodiment, the driver torque demand 58 exceeds the maximum torque capacity 79 of the engine 14. The maximum torque capacity 79 of the engine 14 may be due to external conditions such as ambient temperature or altitude or due to a design choice of a lower maximum torque capability engine. As illustrated by curve 76, the motor 18 may be programmed to output torque such that the engine 14 and motor 18 completely satisfy the driver torque demand during engine steady-state (i.e., between $t_3$ and $t_6$). However, if the motor 18 is used to output torque during engine steady-state, then the battery 20 may not have sufficient energy to provide to the motor 18 for outputting motor torque during subsequent increases in driver torque demand, for example, at $t_7$.

Referring to FIG. 4, curve 78 illustrates battery energy consumed, $\Delta E$ discussed above, as a result of the motor 18 outputting torque according to curve 62. As engine torque (curve 60) ramps up to maximum torque capacity 79 and motor torque output 62 correspondingly ramps down, a value of the moving horizon definite integral of difference between the driver torque demand and engine torque (see Equations (2) and (3)) also increases toward a predefined threshold 80 due to battery energy being consumed to satisfy the driver torque demand. In one embodiment, the predefined threshold 80 is based on the calibratable amount of battery energy available for energy under delivery, $P_{batt}^{avail}$. At $t_4$, the integration of battery power consumed (curve 78) reaches the predefined threshold 80. As such, the motor torque output is set to zero (via the motor torque limit reaching zero) such that the battery 20 is able to provide energy to power the motor 18 during a subsequent driver torque demand at $t_7$. The motor torque output following curve 76 is set to zero subsequently at $t_5$. Because the motor torque output following curve 76 is not reduced to reserve battery energy but, instead, is maintained such that the engine 14 and motor 18 completely satisfy the driver torque demand, the motor 18 is unable to provide any motor torque output for the subsequent increase in driver torque demand at $t_7$ due to insufficient time to recharge the battery 20. Unconditional motor torque to compensate for engine under delivery may result in degraded battery life and vary vehicle response between multiple back-to-back, large driver torque demands.

At $t_6$ when the driver torque demand 58 decreases to a level that the engine 14 is able to completely satisfy without torque output from the motor 18, the value of moving horizon definite integral of difference between the driver torque demand and engine torque (depicted as curve 78) starts reducing from the predefined threshold 80. As the gap between curves 78 and 80 gets larger (i.e., as $\Delta E$ becomes smaller relative to $P_{batt}^{avail}$), the motor torque limit, $\tau_{mtr}^{max}$, as calculated in Equation (4) becomes larger. As such, at $t_7$ the motor torque output, $\tau_{mtr}^{out}$, following curve 62 may be unconstrained by the motor torque limit and be set to the desired motor torque, $\tau_{mtr}^{desired}$, according to Equation (6), such that the engine 14 and motor 18 operate together to completely satisfy the demand at $t_7$ during fill-in (for engine under delivery).

Referring back to FIG. 2, the algorithm may continue with the step 82 of adjusting the motor torque output based on other system limits. For example and without limitation, other system limits that may affect the motor torque output are instantaneous motor torque limits and battery power limits. The motor mechanical limits may be based on motor temperature and inverter voltage, and the battery limits may be based on battery temperature, SOC, and battery health.

The algorithm may continue with the step 84 of commanding the motor torque output, $\tau_{mtr}^{out}$, which may have been adjusted based on other system limits in step 82.

Referring back to FIG. 3, in one embodiment, the controller 50 may be programmed to, responsive to the engine 14 approaching or achieving maximum torque capacity 79 while the engine 14 and motor 18 operate together to completely satisfy the demand (curve 58) that exceeds the maximum torque capacity 79, maintain the engine 14 at the maximum torque capacity 79 and reduce torque output of the motor 18 (curve 62) to a non-zero value such that the engine 14 and motor 18 do not operate to completely satisfy the demand. As shown in Equation (6) above, the non-zero value may be a lesser of (i) a difference between the demand and an engine torque associated with the maximum torque capacity 79 (see Equation (1)) and (ii) a predefined motor torque limit, $\tau_{mtr}^{max}$. The controller 50 may further be programmed to, responsive to the demand (curve 58) falling below the maximum torque capacity 79 of the engine 14 (at $t_6$, for example), reduce torque output of the motor (curve 62) to zero. As shown in FIG. 3, the curve 62 illustrates a gradual decrease of motor torque output.

With reference to FIG. 4, the controller 50 may further be programmed to, responsive an amount of battery energy consumed (curve 78) to satisfy the demand (curve 58) reaching a predefined threshold 80, reduce torque output of the motor (curve 62) to zero. The predefined threshold 80 may be based on the demand and/or the calibratable amount of battery energy, $P_{batt}^{avail}$, discussed above.

With reference to FIG. 3, the engine 14 and motor 18 may be operated to completely satisfy the demand, $\tau_{drv}^{dem}$, (e.g., curve 58) that exceeds the maximum torque capacity 79 of the engine 14 for not more than a predefined amount of time. In the illustrated embodiment, the engine 14 and motor 18 operate to completely satisfy the demand from $t_1$ to $t_2$. The predefined amount of time may be selected such that the motor 18 "fills in" for the engine 14 during a majority of the engine ramp-up period. In some embodiments, the predefined amount of time is less than a minute. In other embodiments, the predefined amount of time is in the range of ten to thirty seconds. The predefined amount of time may vary depending on the specific mode the vehicle is in. For example, if the vehicle is in "sport mode", then the predefined amount of time may be larger such that the driver torque demand is completely satisfied for a longer period of time. If the vehicle is in "city driving" mode, the predefined amount of time may be smaller to ensure battery energy is available for subsequent increases in driver torque demand, due to the frequent stopping. In some embodiments, the predefined amount of time is based on a capacity of the battery 20. For example and without limitation, the predefined amount of time may be smaller for a lower capacity and higher for a higher capacity.

In one embodiment, the controller 50 may be programmed to, responsive to a predefined torque limit, $\tau_{mtr}^{max}$, of the motor 18 falling below a desired motor torque, $\tau_{mtr}^{desired}$, while the engine 14 and motor 18 operate to completely satisfy a propulsive demand, $\tau_{drv}^{dem}$, command the motor 18 to output a torque, $\tau_{mtr}^{out}$, at the predefined torque limit, such that the propulsive demand is not completely satisfied.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A hybrid vehicle comprising:
   an engine;
   a traction motor; and a controller programmed to, responsive to the engine achieving maximum torque capacity while the engine and motor operate to completely satisfy a demand that exceeds the maximum torque capacity, maintain the engine at the maximum torque capacity and reduce torque output of the motor to a non-zero value such that the engine and motor do not operate to completely satisfy the demand.

2. The hybrid vehicle of claim 1, wherein the controller is further programmed to, responsive to the demand falling below the maximum torque capacity of the engine, reduce torque output of the motor to zero.

3. The hybrid vehicle of claim 1, wherein the controller is further programmed to, responsive to an amount of battery energy consumed to satisfy the demand reaching a predefined threshold, reduce torque output of the motor to zero.

4. The hybrid vehicle of claim 3, wherein the predefined threshold is based on the demand or a calibratable amount of battery energy.

5. The hybrid vehicle of claim 1, wherein the non-zero value is a lesser of (i) a difference between the demand and an engine torque associated with the maximum torque capacity and (ii) a predefined motor torque limit.

6. The hybrid vehicle of claim 5, wherein the predefined motor torque limit is based on data indicative of an amount of battery energy consumed to satisfy the demand within a temporal sliding window.

7. The hybrid vehicle of claim 6, wherein the predefined motor torque limit is further based on a calibratable amount of battery energy.

8. The hybrid vehicle of claim 1, wherein the engine and motor operate to completely satisfy the demand that exceeds the maximum torque capacity for not more than a predefined amount of time.

9. The hybrid vehicle of claim 8, wherein the predefined amount of time is based on a capacity of a battery.

10. A method for controlling a powertrain in a hybrid vehicle, comprising:
responsive to an engine approaching maximum torque capacity while the engine and a motor operate together to completely satisfy a demand that exceeds the maximum torque capacity, operating the engine to approach maximum torque capacity and reducing torque output of the motor to a non-zero value such that the engine and motor do not operate to completely satisfy the demand.

11. The method of claim 10, further comprising, responsive to an amount of battery energy consumed to satisfy the demand reaching a predefined threshold, reducing torque output of the motor to zero.

12. The method of claim 11, wherein the predefined threshold is based on a calibratable amount of battery energy.

13. The method of claim 10, wherein the non-zero value is a lesser of (i) a difference between the demand and an engine torque associated with the maximum torque capacity and (ii) a predefined motor torque limit.

14. The method of claim 13, wherein the predefined motor torque limit is based on data indicative of an amount of battery energy consumed to satisfy the demand within a temporal sliding window.

15. A powertrain system for a vehicle, comprising:
a controller programmed to, responsive to a predefined torque limit of a motor falling below a desired motor torque while an engine and the motor operate to completely satisfy a propulsive demand, command the motor to output a torque at the predefined torque limit such that the demand is not completely satisfied.

16. The powertrain system of claim 15, wherein the controller is further programmed to, responsive to an amount of battery energy consumed to satisfy the demand reaching a predefined threshold, reduce the torque to zero.

17. The powertrain system of claim 16, wherein the predefined threshold is based on a calibratable amount of battery energy.

18. The powertrain system of claim 15, wherein the controller is further programmed to, responsive to the propulsive demand falling below a maximum torque capacity of the engine, reduce the torque to zero.

19. The powertrain system of claim 15, wherein the predefined torque limit of the motor is based on data indicative of an amount of battery energy consumed to satisfy the demand within a temporal sliding window.

* * * * *